(12) United States Patent
Jöngren

(10) Patent No.: US 10,079,631 B2
(45) Date of Patent: *Sep. 18, 2018

(54) CSI REPORTING FOR A SET OF CSI-RS RESOURCES

(71) Applicant: Telefonaktiebolaget L M Ericsson (publ), Stockholm (SE)

(72) Inventor: George Jöngren, Sundbyberg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/040,079

(22) Filed: Feb. 10, 2016

(65) Prior Publication Data
US 2016/0173182 A1    Jun. 16, 2016

Related U.S. Application Data

(63) Continuation of application No. 13/701,301, filed as application No. PCT/EP2012/071531 on Oct. 31, 2012, now Pat. No. 9,264,120.
(Continued)

(51) Int. Cl.
*H04B 7/06* (2006.01)
*H04L 1/00* (2006.01)
(Continued)

(52) U.S. Cl.
CPC .......... *H04B 7/0626* (2013.01); *H04B 7/024* (2013.01); *H04B 7/0456* (2013.01); *H04B 7/063* (2013.01);
(Continued)

(58) Field of Classification Search
CPC .. H04B 7/0486; H04B 7/0417; H04B 7/0452; H04B 7/0456; H04B 7/046;
(Continued)

(56) References Cited

U.S. PATENT DOCUMENTS 8,711,716 B2    4/2014    Chen et al.
2007/0005749 A1    1/2007    Sampath
(Continued)

FOREIGN PATENT DOCUMENTS

EP    2777198 A1    9/2014
WO    2009088225 A2    7/2009
(Continued)

OTHER PUBLICATIONS

3rd Generation Partnership Project, "Technical Specification Group Radio Access Network; Evolved Universal Terrestrial Radio Access (E-UTRA); Physical layer procedures (Release 10)", 3GPP TS 36.213 V10.7.0, Sep. 2012, pp. 1-126.
(Continued)

*Primary Examiner* — Joshua Kading
(74) *Attorney, Agent, or Firm* — Coats & Bennett, PLLC

(57) ABSTRACT

A method implemented by a wireless terminal of reporting channel state information to a wireless communication network is disclosed. The wireless terminal receives reference symbols on a set of channel state information reference symbol (CSI-RS) resources, and determines a common transmission rank for the set of CSI-RS resources, based on the reference symbols received on a subset of those CSI-RS resources. The terminal then generates CSI feedback as a function of the common transmission rank, and transmits the CSI feedback to the communication network. The CSI feedback may include the common transmission rank itself, or may include different transmission ranks for different CSI-RS resources each determined as a function of the common transmission rank. A complementary method in which a network node uses such a CSI feedback to perform rank adaptation for the set of CSI-RS resources is also disclosed.

16 Claims, 17 Drawing Sheets

Related U.S. Application Data

(60) Provisional application No. 61/557,509, filed on Nov. 9, 2011.

(51) Int. Cl.
*H04W 24/02* (2009.01)
*H04B 7/024* (2017.01)
*H04B 7/0456* (2017.01)
*H04L 5/00* (2006.01)

(52) U.S. Cl.
CPC ........... *H04B 7/066* (2013.01); *H04B 7/0632* (2013.01); *H04B 7/0639* (2013.01); *H04L 1/0026* (2013.01); *H04L 1/0028* (2013.01); *H04L 1/0077* (2013.01); *H04L 5/0048* (2013.01); *H04W 24/02* (2013.01)

(58) Field of Classification Search
CPC .. H04B 7/0465; H04B 7/0473; H04B 7/0626; H04B 7/0628; H04B 7/063; H04B 7/0632; H04B 7/0634; H04B 7/0639; H04B 7/0619; H04L 25/03923; H04L 25/03929; H04L 25/03949; H04L 25/03955; H04L 25/03898; H04L 1/0006; H04L 1/0009; H04L 1/0014; H04L 1/0015; H04L 1/0023; H04L 1/0026; H04L 1/0028; H04L 1/0031
See application file for complete search history.

(56) References Cited

U.S. PATENT DOCUMENTS

| | | |
|---|---|---|
| 2011/0009148 A1 | 1/2011 | Kotecha |
| 2011/0032839 A1 | 2/2011 | Chen et al. |
| 2011/0194632 A1 | 8/2011 | Clerckx et al. |
| 2011/0273993 A1 | 11/2011 | Mazzarese et al. |
| 2011/0299484 A1 | 12/2011 | Nam et al. |
| 2012/0287799 A1 | 11/2012 | Chen et al. |
| 2012/0287875 A1* | 11/2012 | Kim ...................... H04B 7/024 370/329 |
| 2013/0003788 A1 | 1/2013 | Marinier et al. |
| 2013/0077707 A1 | 3/2013 | Koivisto et al. |
| 2013/0114656 A1 | 5/2013 | Sayana et al. |

FOREIGN PATENT DOCUMENTS

| | | |
|---|---|---|
| WO | 2011100672 A1 | 8/2011 |
| WO | 2012094608 A2 | 7/2012 |
| WO | 2013068282 A1 | 5/2013 |

OTHER PUBLICATIONS

3rd Generation Partnership Project, "Technical Specification Group Radio Access Network; Coordinated Multi-Point Operation for LTE Physical Layer Aspects (Release 11)", 3GPP TR 36.819 V1.2.0, Sep. 2011, pp. 1-70.

LG Electronics, "Consideration on CoMP CSI Feedback", 3GPP TSG RAN WG1 Meeting #66bis, Oct. 10-14, 2011, pp. 1-6, Zhuhai, China, R1-113275.

Ericsson et al., "CSI Feedback for DL CoMP", 3GPP TSG-RAN WG1 #67, Nov. 14-18, 2011, pp. 1-4, San Francisco, US, R1-114258.

ZTE, "Remaining Issues of CSI Feedback", 3GPP TSG RAN WG1 Meeting #63bis, Jan. 17-21, 2011, pp. 1-4, Dublin, Ireland, R1-110174.

LG Electronics, "CQI calculation for CoMP", 3GPP TSG RAN WG1 Meeting #66bis, Oct. 10-14, 2011, Zhuhai, China, R1-113276.

Intel Corporation, "Unified CSI feedback framework for CoMP schemes", 3GPP TSG-RAN WG1 #67, Nov. 14-18, 2011, San Francisco, US, R1-113663.

* cited by examiner

US 10,079,631 B2

CSI REPORTING FOR A SET OF CSI-RS RESOURCES

RELATED APPLICATIONS

The present application is a continuation of U.S. patent application Ser. No. 13/701,301, which was filed on Nov. 30, 2012, which is a national stage application of PCT/EP2012/071531, filed on Oct. 31, 2012, and claims benefit of U.S. Provisional Application 61/557,509, filed on Nov. 9, 2011, the disclosures of each of which are incorporated herein by reference in their entirety.

TECHNICAL FIELD

The present invention generally relates to channel state information reporting and transmission rank adaptation based on such reporting, and more particularly relates to performing channel state information reporting for a set of channel state information reference symbol (CSI-RS) resources as a function of a common transmission rank determined based on a subset of those resources.

BACKGROUND

LTE uses OFDM in the downlink and DFT-spread OFDM in the uplink. FIGS. 1-3 provide an overview of LTE downlink transmissions. Referring to FIG. 1 in particular, the basic LTE physical resource can thus be seen as a time-frequency grid, where each resource element corresponds to one subcarrier during one OFDM symbol interval (on a particular antenna port).

As shown in FIG. 1, in the time domain, LTE downlink transmissions are organized into radio frames of 10 ms, each radio frame consisting of ten equally-sized subframes of 1 ms as illustrated in FIG. 2. A subframe is divided into two slots, each of 0.5 ms time duration.

As shown in FIG. 2, the resource allocation in LTE is described in terms of resource blocks, where a resource block corresponds to one slot in the time domain and 12 contiguous 15 kHz subcarriers in the frequency domain. Two in time consecutive resource blocks represent a resource block pair and correspond to the time interval upon which scheduling operates.

Transmissions in LTE are dynamically scheduled in each subframe where the base station transmits downlink assignments/uplink grants to certain UEs via the physical downlink control channel (PDCCH). The PDCCHs are transmitted in the first OFDM symbol(s) in each subframe and spans (more or less) the whole system bandwidth. A UE that has decoded a downlink assignment, carried by a PDCCH, knows which resource elements in the subframe that contain data aimed for the UE. Similarly, upon receiving an uplink grant, the UE knows which time/frequency resources it should transmit upon. In LTE downlink, data is carried by the physical downlink shared channel (PDSCH) and in the uplink the corresponding channel is referred to as the physical uplink shared channel (PUSCH). For additional information on the physical layer in LTE, see, e.g., 3GPP TS 36.213, "Physical layer procedures."

Demodulation of sent data requires estimation of the radio channel which is done by using transmitted reference symbols (RS), i.e. symbols known by the receiver. In LTE, cell specific reference symbols (CRS) are transmitted in all downlink subframes and in addition to assist downlink channel estimation they are also used for mobility measurements performed by the UEs. LTE also supports UE specific RS aimed only for assisting channel estimation for demodulation purposes. FIG. 3 illustrates how the mapping of physical control/data channels and signals can be done on resource elements within a downlink subframe. In this example, the PDCCHs occupy the first out of three possible OFDM symbols, so in this particular case the mapping of data could start already at the second OFDM symbol. Since the CRS is common to all UEs in the cell, the transmission of CRS cannot be easily adapted to suit the needs of a particular UE. This is in contrast to UE specific RS which means that each UE has RS of its own placed in the data region of FIG. 3 as part of PDSCH.

Referring to FIG. 3, the length of the control region, which can vary on subframe basis, is conveyed in the Physical Control Format Indicator CHannel (PCFICH). The PCFICH is transmitted within control region, at locations known by terminals. After a terminal has decoded the PCFICH, it thus knows the size of the control region and in which OFDM symbol the data transmission starts.

Also transmitted in the control region is the Physical Hybrid-ARQ Indicator Channel. This channel carries ACK/NACK responses to a terminal to inform if the uplink data transmission in a previous subframe was successfully decoded by the base station or not.

Precoding

A core component in LTE is the support of MIMO antenna deployments and MIMO related techniques. LTE Rel-10 supports up to eight layer spatial multiplexing with possibly channel dependent precoding. The target is high data rates in favorable channel conditions. An illustration of spatial multiplexing is provided in FIG. 4.

As seen in FIG. 4, the information carrying symbol vector s is multiplied by an $N_T \times r$ precoder matrix $W_{N_T \times r}$, which serves to distribute the transmit energy in a subspace of the $N_T$ (corresponding to $N_T$ antenna ports) dimensional vector space. The precoder matrix is typically selected from a codebook of possible precoder matrices, and typically indicated by means of a precoder matrix indicator (PMI), which specifies a unique precoder matrix in the codebook. If the precoder matrix is confined to have orthonormal columns, then the design of the codebook of precoder matrices corresponds to a Grassmannian subspace packing problem. The r symbols in s each correspond to a layer and r is referred to as the transmission rank. In this way, spatial multiplexing is achieved since multiple symbols can be transmitted simultaneously over the same time-frequency resource element (TFRE). The number of symbols r is typically adapted to suit the current channel properties.

LTE uses OFDM in the downlink (and DFT precoded OFDM in the uplink) and hence the received $N_R \times 1$ vector $y_n$ for a certain TFRE on subcarrier n (or alternatively data TFRE number n), assuming no inter-cell interference, is thus modeled by $$y_n = H_n W_{N_T \times r} s_n + e_n \qquad \text{equation (1)}$$

where $e_n$ is a noise vector obtained as realizations of a random process. The precoder, $W_{N_T \times r}$, can be a wideband precoder, which is constant over frequency, or frequency-selective.

The precoder matrix is often chosen to match the characteristics of the $N_R \times N_T$ MIMO channel H, resulting in so-called channel dependent precoding. This is also commonly referred to as closed-loop precoding and essentially strives for focusing the transmit energy into a subspace which is strong in the sense of conveying much of the transmitted energy to the UE. In addition, the precoder matrix may also be selected to strive for orthogonalizing the channel, meaning that after proper linear equalization at the UE, the inter-layer interference is reduced.

In closed-loop precoding, the UE transmits, based on channel measurements in the forward link (downlink), recommendations to the eNodeB of a suitable precoder to use. A single precoder that is supposed to cover a large bandwidth (wideband precoding) may be fed back. It may also be beneficial to match the frequency variations of the channel and instead feedback a frequency-selective precoding report, e.g. several precoders, one per subband. This is an example of the more general case of channel state information (CSI) feedback, which also encompasses feeding back other entities than precoders to assist the eNodeB in subsequent transmissions to the UE. Such other information may include channel quality indicators (CQIs) as well as transmission rank indicator (RI).

Coordination of Nodes/Points—CoMP

In a classical cellular deployment, the intended service area is covered by several sites at different geographical positions. Each site has antennas servicing an area around the site. Often, a site is further subdivided into multiple sectors, where perhaps the most common case is to use three 120 degree wide sectors. Such a scenario is illustrated in FIG. 5. A sector corresponds to a cell and a base station associated with the cell is controlling and communicating with the UEs within that cell. The scheduling and transmissions to and reception from the UEs are to a large degree independent from one cell to another.

Simultaneous transmissions on the same frequencies will naturally interfere with each other and thus lower the quality of the reception. Interference is a major obstacle in cellular networks and in such a classical deployment scenario is primarily controlled by planning the network carefully, placing the sites at appropriate locations, tilting the antennas, etc.

Performing independent scheduling between different cells has the advantage of being simple and requiring relatively modest communication capabilities between different sites. On the other hand, the cells affect each other in that signals originating from one cell are seen as interference in nearby cells. This indicates that there are potential benefits in coordinating the transmissions from nearby cells. Frequency, time, as well as space can be exploited in the coordination to mitigate interference. Such coordination has recently received substantial interest in both academic literature and standardization of new wireless technologies. In fact, so-called coordinated multi point transmission/reception (CoMP) is considered one of the key technology components for the upcoming Release 11 of LTE (see, e.g., 3GPP TR 36.819, V1.2.0, "Coordinated Multi-Point Operation for LTE").

The concept of a point is worth elaborating upon. A point corresponds to a set of antennas intending to cover essentially the same geographical area in essentially a similar manner. Thus a point might correspond to one of the sectors at a site, but it may also correspond to a site having one or more antennas all intending to cover a similar geographical area in a similar manner. Often, different points represent different sites. Antennas correspond to different points when they are sufficiently geographically separated and/or having antenna diagrams pointing in sufficiently different directions, but typically not when they belong to the same sector. Techniques for CoMP entail introducing dependencies in the scheduling or transmission/reception among different points, in contrast to conventional cellular systems where a point from a scheduling point of view is operated more or less independently from the other points.

Downlink CoMP can be classified into coordinated scheduling and joint transmission. In the former, the transmission to a UE comes from a single point at a time while in the latter case multiple points are simultaneously involved. FIG. 5 illustrates the use of CoMP for a group of seven points (see area enclosed by dotted line), the so-called CoMP cluster. In this particular case, each point has a one-to-one correspondence with a cell.

Obviously, coordination between sites requires some kind of communication between the sites. This can take many forms and the requirements on data rates and latency are to a large extent dependent on the exact coordination scheme being used.

Apart from the potential problem of site-to-site communication capability, coordination exploiting time and frequency is for OFDM systems like LTE easily achieved using the normal dynamic resource allocation feature which can transmit the PDSCH to a particular UE on selected RB pairs and in a certain subframe. Spatial coordination involves utilizing multiple antennas for the transmission. By modeling the signals as vector-valued signals and applying appropriate complex-valued matrix weights, the transmission can be focused in the direction (in physical space or in a more abstract vector space) of the UE while minimizing the interference to other UEs, thus increasing the SINR and ultimately the performance of the system.

Classical Versus Single Cell Deployments

The classical way of deploying a network is to let different transmission/reception points form separate cells. That is, the signals transmitted from or received at a point is associated with a cell-id that is different from the cell-id employed for other nearby points. Conventionally, each point transmits its own unique signals for broadcast (PBCH) and sync channels (PSS, SSS).

The mentioned classical strategy of one cell-id per point is depicted in FIG. 6 for a heterogeneous deployment where a number of low power (pico) points are placed within the coverage area of a higher power macro point. Note that similar principles obviously also apply to classical macro-cellular deployments where all points have similar output power and perhaps placed in a more regular fashion than what is the case for a heterogeneous deployment.

An alternative to the classical deployment strategy is to instead let all the UEs within the geographical area outlined by the coverage of the high power macro point be served with signals associated with the same cell-id. In other words, from a UE perspective, the received signals appear coming from a single cell. This is illustrated in FIG. 7. Note that only one macro point is shown, other macro points would typically use different cell-ids (corresponding to different cells) unless they are co-located at the same site (corresponding to other sectors of the macro site). In the latter case of several co-located macro points, the same cell-id may be shared across the co-located macro-points and those pico points that correspond to the union of the coverage areas of the macro points. Sync, BCH and control channels are all transmitted from the high power point while data can be transmitted to a UE also from low power points by using shared data transmissions (PDSCH) relying on UE specific RS. Such an approach has benefits for those UEs that are capable of PDSCH based on UE specific RS while UEs only supporting CRS for PDSCH (which is likely to at least include all Release 8/9 UEs for FDD) has to settle with the transmission from the high power point and thus will not benefit in the downlink from the deployment of extra low power points.

The single cell-id approach is geared towards situations in which there is fast backhaul communication between the points associated to the same cell. A typical case would be a base station serving one or more sectors on a macro level as well as having fast fiber connections to remote radio units (RRUs) playing the role of the other points sharing the same cell-id. Those RRUs could represent low power points with one or more antennas each. Another example is when all the points have a similar power class with no single point having more significance in than the others. The base station would then handle the signals from all RRUs in a similar manner.

A clear advantage of the shared cell approach compared with the classical one is that the typically involved handover procedure between cells only needs to be invoked on a macro basis. Another important advantage is that interference from CRS is greatly reduced since CRS does not have to be transmitted from every point. There is also much greater flexibility in coordination and scheduling among the points which means the network can avoid relying on the inflexible concept of semi-statically configured "low interference" subframes as in Rel-10 eICIC. A shared cell approach also allow decoupling of the downlink with the uplink so that for example path loss based reception point selection can be performed in uplink while not creating a severe interference problem for the downlink, where the UE may be served by a transmission point different from the point used in the uplink reception.

CSI-RS

As previously indicated, CRS are not the only reference symbols available in LTE. As of LTE Release-10, a new RS concept was introduced with separate UE specific RS for demodulation of PDSCH and RS for measuring the channel for the purpose of channel state information (CSI) feedback from the UE. The latter is referred to as CSI-RS. CSI-RS are not transmitted in every subframe and they are generally sparser in time and frequency than RS used for demodulation. CSI-RS transmissions may occur every $5^{th}$, $10^{th}$, $20^{th}$, $40^{th}$, or $80^{th}$ subframe according to an RRC configured periodicity parameter and an RRC configured subframe offset.

A UE operating in connected mode can be requested by the base station to perform channel state information (CSI) reporting, e.g. reporting a suitable rank indicator (RI), one or more precoding matrix indices (PMIs) and a channel quality indicator (CQI). Other types of CSI are also conceivable including explicit channel feedback and interference covariance feedback. The CSI feedback assists the network in scheduling, including deciding the subframe and RBs for the transmission, which transmission scheme/precoder to use, as well as provides information on a proper user bit rate for the transmission (link adaptation). In LTE, both periodic and aperiodic CSI reporting is supported. In the case of periodic CSI reporting, the terminal reports the CSI measurements on a configured periodical time basis on the physical uplink control channel (PUCCH), whereas with aperiodic reporting the CSI feedback is transmitted on the physical uplink shared channel (PUSCH) at pre-specified time instants after receiving the CSI grant from the base station. With aperiodic CSI reports, the base station can thus request CSI reflecting downlink radio conditions in a particular subframe.

FIGS. 8a-c provide a detailed illustration of which resource elements within a resource block pair may potentially be occupied by the new UE specific RS and CSI-RS. The CSI-RS utilizes an orthogonal cover code of length two to overlay two antenna ports on two consecutive REs. As seen, many different CSI-RS patterns are available. For the case of 2 CSI-RS antenna ports we see that there are twenty different patterns within a subframe. The corresponding number of patterns is 10 and 5 for 4 and 8 CSI-RS antenna ports, respectively. For TDD, some additional CSI-RS patterns are available. A pattern may in LTE Rel-10 correspond to 1, 2, 4, or 8 CSI-RS antenna ports.

Subsequently in this disclosure, the term CSI-RS resource is used to refer to a selection of resource elements corresponding to a CSI-RS. In FIGS. 8a-c, for example, the resource elements corresponding to a CSI-RS resource share the same shading. In such a case, a resource corresponds to a particular pattern present in a particular subframe. Thus two different patterns in the same subframe or the same CSI-RS pattern but in different subframes in both cases constitute two separate CSI-RS resources. In LTE Rel-10, a CSI-RS resource can alternatively be thought of being pointed out by a combination of "resourceConfig" and "subframeConfig" which are configured by higher layers.

The CSI-RS patterns may also correspond to so-called zero-power CSI-RS, also referred to as muted REs. Zero-power CSI-RS corresponds to a CSI-RS pattern whose REs are silent, i.e., there is no transmitted signal on those REs. Such silent patterns are configured with a resolution corresponding to the four antenna port CSI-RS patterns. Hence, the smallest unit to silence corresponds to four REs.

The purpose of zero-power CSI-RS is to raise the SINR for CSI-RS in a cell by configuring zero-power CSI-RS in interfering cells so that the REs otherwise causing the interference are silent. Thus, a CSI-RS pattern in a certain cell is matched with a corresponding zero-power CSI-RS pattern in interfering cells. Raising the SINR level for CSI-RS measurements is particularly important in applications such as coordinated multi point (CoMP) or in heterogeneous deployments. In CoMP, the UE is likely to need to measure the channel from non-serving points and interference from the much stronger serving point would in that case be devastating. Zero-power CSI-RS is also needed in heterogeneous deployments where zero-power CSI-RS in the macro-layer is configured so that it coincides with CSI-RS transmissions in the pico-layer. This avoids strong interference from macro nodes when UEs measure the channel to a pico node.

The PDSCH is mapped around the REs occupied by CSI-RS and zero-power CSI-RS so it is important that both the network and the UE are assuming the same CSI-RS/zero power CSI-RS configuration or else the UE is unable to decode the PDSCH in subframes containing CSI-RS or their zero-power counterparts.

CSI Feedback for CoMP

To assist scheduling and link adaptation when performing CoMP, it is useful to let the UE feedback CSI corresponding to the channels of multiple points to the network. Such feedback allows the network to assess the impact on system performance (i.e., taking multiple points into account) of scheduling a UE on a certain resource and with a certain precoder. This may then be exploited for devising efficient scheduling strategies across multiple points.

CSI feedback for CoMP can come in many different forms but a common scheme is to let each UE report CSI feedback for each CSI-RS resource in a set of relevant CSI-RS resources that are used for the feedback reporting, the so-called (CoMP) reporting set. A relevant CSI-RS resource typically corresponds to the transmission of a CSI-RS pattern that can be heard sufficiently well by the UE. Often, such a transmission would be conducted from a specific point, meaning that per CSI-RS resource feedback can be thought of as CSI feedback per point.

FIG. 9 illustrates an example prior art CSI reporting configuration, in which a CSI report 20 transmitted by a UE includes separately-determined feedback for each CSI-RS resource (i.e., CSI feedback per CSI-RS resource), and each of a plurality of precoders uses a separate one of the feedback values. Also, in FIG. 9, CQI and precoder $W_k$ (implied from PMI and RI) are determined separately for each CSI-RS resource. Thus, CQI, rank, and precoder would be determined separately for each CSI-RS resource that is reported. A similar concept is already adopted for carrier aggregation where CSI for each carrier (cell) is determined separately. Transmission formats and procedures for carrier aggregation can thus be reused for CoMP feedback, thus greatly simplifying the introduction of new feedback into the specifications. Per CSI-RS resource feedback also has the benefit of limiting UE complexity in that separately determining CSI for each CSI-RS resource is less complex than jointly determining CSI for all CSI-RS resources at once.
Problems with Existing Solutions MIMO with spatial multiplexing based on rank adaptation is commonly employed in LTE to match the transmission to the properties of the channel, thereby improving the performance and offering high peak rates under good channel conditions. Existing solutions, however, do not clearly contemplate how to perform efficient rank determination for CoMP CSI feedback.

SUMMARY

One or more embodiments herein recognize that, with separate CSI feedback for each CSI-RS resource, the reported ranks will typically be different. This creates problems for the network to determine channel quality as well as suitable precoder weights. Moreover, this results in degraded performance of the system and/or additional complexities in the network.

Accordingly, one or more embodiments relate to improvements in conducting CSI feedback for multiple channel state information reference symbol (CSI-RS) resources. For a given set of CSI-RS resources, a common transmission rank determined based on a subset of the CSI-RS resources is used for CSI reporting. In some embodiments, this is advantageously used to reduce signaling overhead between a wireless terminal transmitting CSI feedback, and a network node that receives the CSI feedback and uses it for performing rank adaptation.

With this in mind, an exemplary method implemented by a wireless terminal for reporting channel state information (CSI) to a wireless communication network according to one or more embodiments is disclosed. The wireless terminal receives reference symbols on a set of CSI-RS resources, and determines a common transmission rank for the set of CSI-RS resources, based on the reference symbols received on a subset of those CSI-RS resources. The terminal generates CSI feedback as a function of the common transmission rank, and transmits the CSI feedback to the communication network.

In or more embodiments, the CSI feedback is generated to include the determined common transmission rank. In one such embodiment, the transmission rank for each CSI-RS resource within the set is determined to be the common transmission rank, and the common transmission rank is correspondingly included one or more times in the CSI feedback.

In another example, generating the CSI feedback includes determining different transmission ranks for different CSI-RS resources within the set as a function of the common transmission rank, and including the different transmission ranks in the CSI feedback. In this latter embodiment, determining different transmission ranks for different CSI-RS resources may include determining, for each CSI-RS resource within the set, a transmission rank for the CSI-RS resource as a minimum between the common transmission rank and a maximum possible transmission rank for the CSI-RS resource.

In one example, different transmission ranks are determined for different CSI-RS resources within the set as a function of the common transmission rank, and a precoder and a channel quality indicator (CQI) for each CSI-RS resource within the set are determined based on the transmission rank determined for that CSI-RS resource. The CSI feedback in this example is generated to include the precoder and CQI determined for each CSI-RS resource within the set.

In one example the subset only includes a single one of the CSI-RS resources within the set. In the same or another embodiment, the wireless terminal determines which CSI-RS resources are included in the subset based on signaling received from the wireless communication network.

According to one or more additional embodiments, the step of determining a common transmission rank is performed by a network node instead of the wireless terminal. Thus, in these embodiments, the wireless terminal receives reference symbols on a set of CSI-RS resources, and generates CSI feedback as a function of a common transmission rank, with the common transmission rank being common for the set of CSI-RS resources. The wireless terminal then transmits the CSI feedback to the communication network.

A corresponding wireless terminal operative to transmit channel state information (CSI) feedback to a wireless communication network according to one or more of the various embodiments discussed above is also disclosed.

A method implemented by a network node for adapting the transmission rank of a transmission between a wireless device and a wireless communication network is also disclosed. The network node transmits reference symbols on a set of CSI-RS resources, and then receives CSI feedback that includes a common transmission rank for the set of CSI-RS resources, wherein the common transmission rank in the CSI feedback is common for the set of CSI-RS resources. The network node also performs rank adaptation for the set of CSI-RS resources based on the common transmission rank.

In one or more embodiments, the received feedback includes the common transmission rank. In one such embodiment, the network node determines the transmission rank for each CSI-RS resource in the set to be the common transmission rank, based on the only transmission rank included in the CSI feedback for the set being the common transmission rank.

In one example embodiment, the network node determines different transmission ranks for different CSI-RS resources within the set as a function of the common transmission rank. The different transmission rank for a given CSI-RS resources may be determined as a minimum between the common transmission rank and a maximum possible transmission rank for the CSI-RS resource.

In one embodiment, the subset includes a single one of the CSI-RS resources within the set, and the network node dynamically switches between a Coordinated Multi-Point (CoMP) transmission scheme and a non-CoMP transmission scheme based on CSI feedback for the single CSI-RS resource within the set (e.g., switch to non-CoMP if CSI feedback is only provided for a single CSI-RS resource). The network node may transmit an indication of the CSI-RS resources in the set to be included in the subset.

A corresponding network node operative to adapt the transmission rank of a transmission between a wireless device and a wireless communication network according to one or more of the embodiments discussed above is also disclosed.

One exemplary embodiment comprises a method of reporting channel conditions that is implemented by a wireless terminal in a communication network. According to the method, reference symbols are received on two or more channel state information resources in a reporting set, each of which is associated with one or more network nodes. A common rank-affecting parameter is determined for the channel state information resources in said reporting set based on the reference symbols received on a subset of the channel state information resources in the reporting set. A channel state report including the common rank-affecting parameter for the reporting set is sent to one or more network nodes associated with the channel state information resources in the reporting set.

A corresponding wireless terminal operative to implement the method to report channel conditions is also disclosed. The wireless terminal includes a transceiver configured to receive reference symbols on two or more channel state information resources in a reporting set, each of which is associated with one or more network nodes. The wireless terminal also includes a processor operatively coupled to the transceiver. The processor is configured to determine a common rank-affecting parameter for the channel state information resources in said reporting set based on the reference symbols received on a subset of the channel state information resources in the reporting set. The processor is further configured to send a channel state report including the common rank-affecting parameter for the reporting set to one or more network nodes associated with the channel state information resources in the reporting set.

Another exemplary embodiment of the invention comprises a method of channel state reporting that is implemented in a network node in a wireless communication network. According to this method, the network node configures channel state reporting by a wireless terminal by sending the wireless terminal configuration information including: an indication of two or more channel state information resources forming a reporting set for the wireless terminal, and an indication of a subset of the channel state information resources in the reporting set to be used by the wireless terminal for determining a common rank-affecting parameter for the channel state information resources in the reporting set. The network node also receives a channel state report from the wireless terminal including said common rank-affecting parameter for the channel state information resources in the reporting set.

A corresponding network node operable to implement this method according to one or more embodiments is also disclosed. The network node includes a transceiver configured to send messages to and receive messages from a wireless terminal in a wireless communication network, and a processor operatively coupled to the transceiver. The processor is operative to configure channel state reporting by the wireless terminal by sending the wireless terminal configuration information including an indication of two or more channel state information resources forming a reporting set for the wireless terminal, and an indication of a subset of the channel state information resources in the reporting set to be used by the wireless terminal for determining a common rank-affecting parameter for the channel state information resources in the reporting set. The processor is further operative to receive, via the transceiver, a channel state report from the wireless terminal including said common rank-affecting parameter for the channel state information resources in the reporting set.

In one or more embodiments, the indication of two or more channel state information resources corresponds to one or more channel state information reference symbols (CSI-RS), and the network node determines a Multiple-Input/Multiple-Output (MIMO) precoder rank for each of the plurality of CSI-RS resources responsive to the received rank-affecting parameter.

In one example, the common rank-affecting parameter comprises a common rank. In one example, each of the reference symbols corresponds to a channel state information reference symbol (CSI-RS). The two or more channel information resources may include, for example, two, four, or eight resource elements. The quantity of channel information resources, and the quantity of resource elements within each of the channel information resources, may be determined by a quantity of ports utilized by the network node transmitting the reference symbols to the wireless terminal.

In one or more embodiments, the wireless terminal also determines a separate precoder matrix index and a separate channel quality indicator for each channel state information resource. The channel state report may also include the determined precoder matrix index and channel quality indicator for the subset of the channel state information resources.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 10:
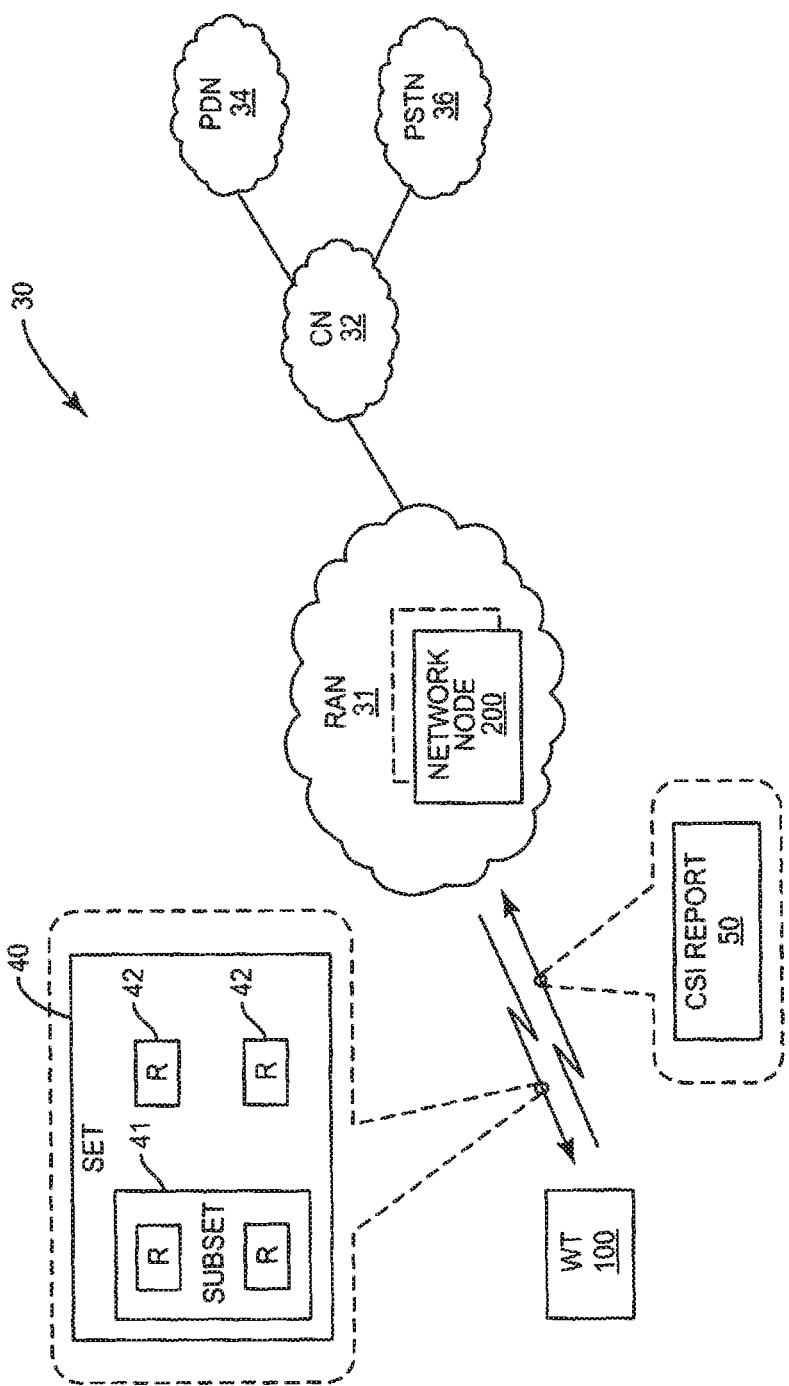
FIG. 10 illustrates an example wireless communication network.

FIG. 10 illustrates a wireless communication network 30 in which a wireless terminal (WT) 100 communicates wirelessly with one or more network nodes 200 in a Radio Access Network (RAN) 31 portion of the larger network 30. The WT 100 may include a cellular telephone, user equipment (UE), smartphone, machine type communication (MTC) device, laptop computer, etc. The one or more network nodes 200 in turn communicate with a core network (CN) 32 portion of the network 30. The core network 32 is in communication with one or more external networks, such as a packet data network (PDN) 34 (e.g., the Internet) and a Public Switched Telephone Network (PSTN) 36.

Figure 1:
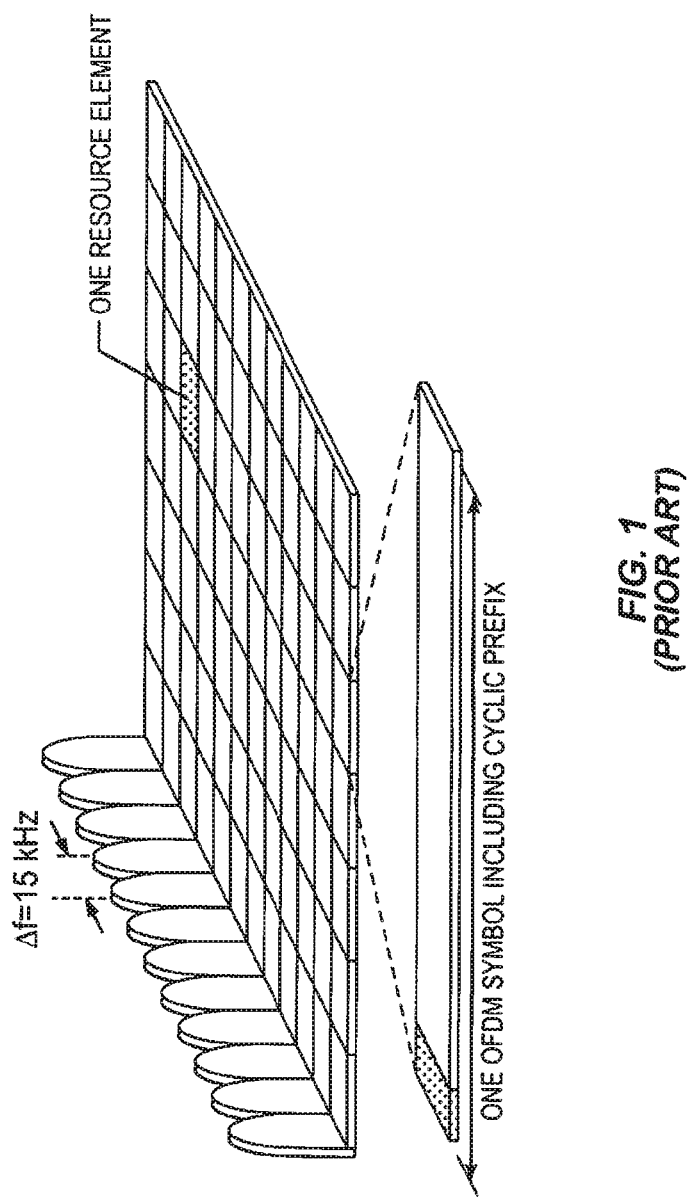
FIG. 1 illustrates an LTE downlink physical resource time-frequency grid.
Figure 2:
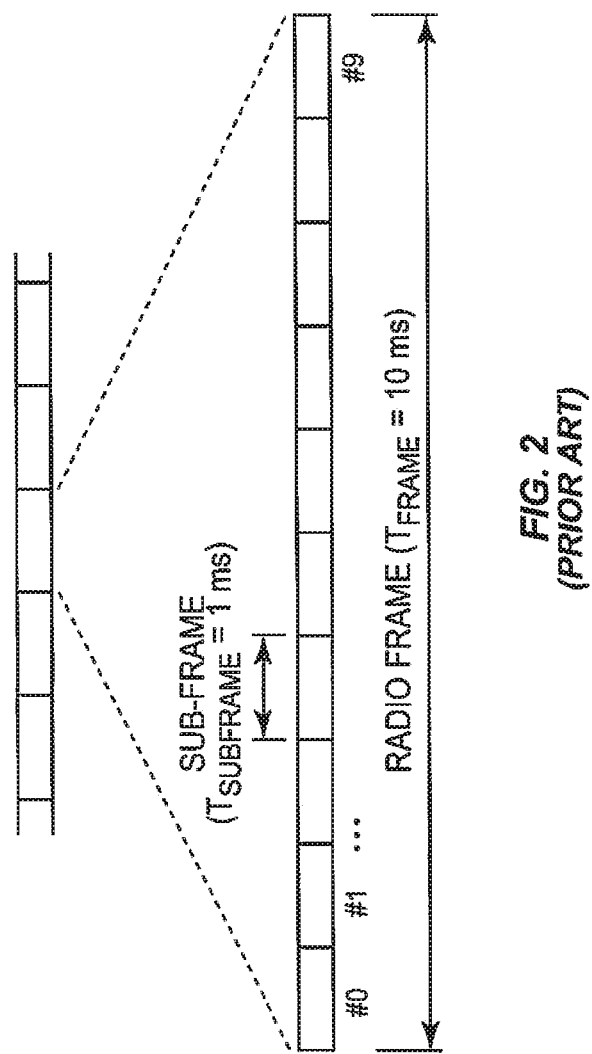
FIG. 2 illustrates an LTE time-domain structure.
Figure 3:
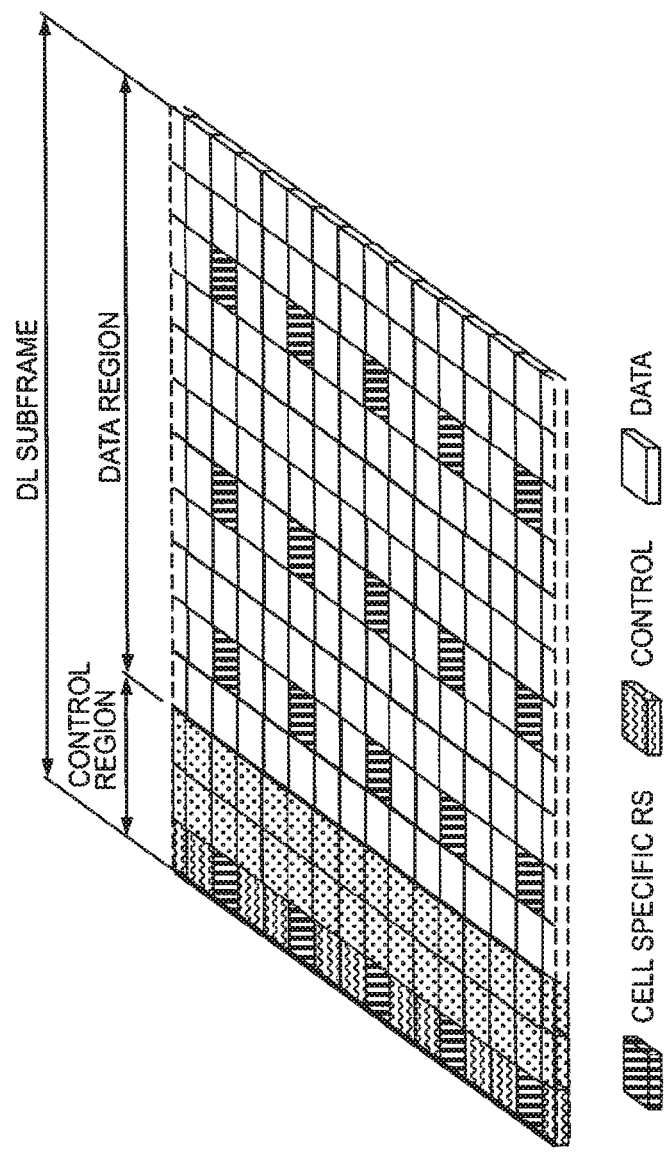
FIG. 3 illustrates an LTE downlink subframe, and its associated mapping of physical control channels, data channels, and cell-specific reference signals.
Figure 4:
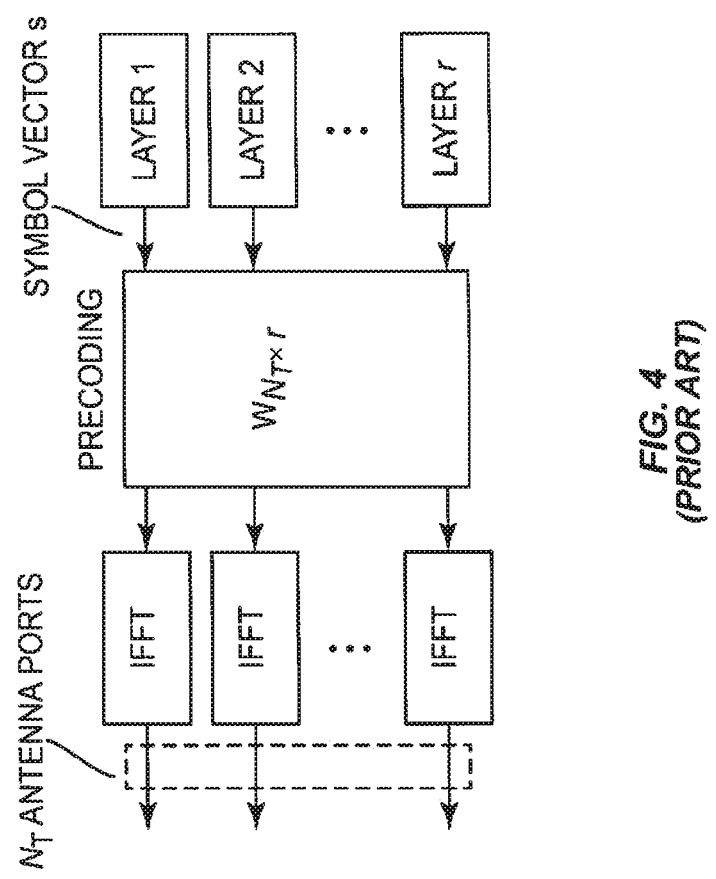
FIG. 4 illustrates a transmission arrangement of a pre-coded spatial multiplexing mode in LTE.
Figure 5:
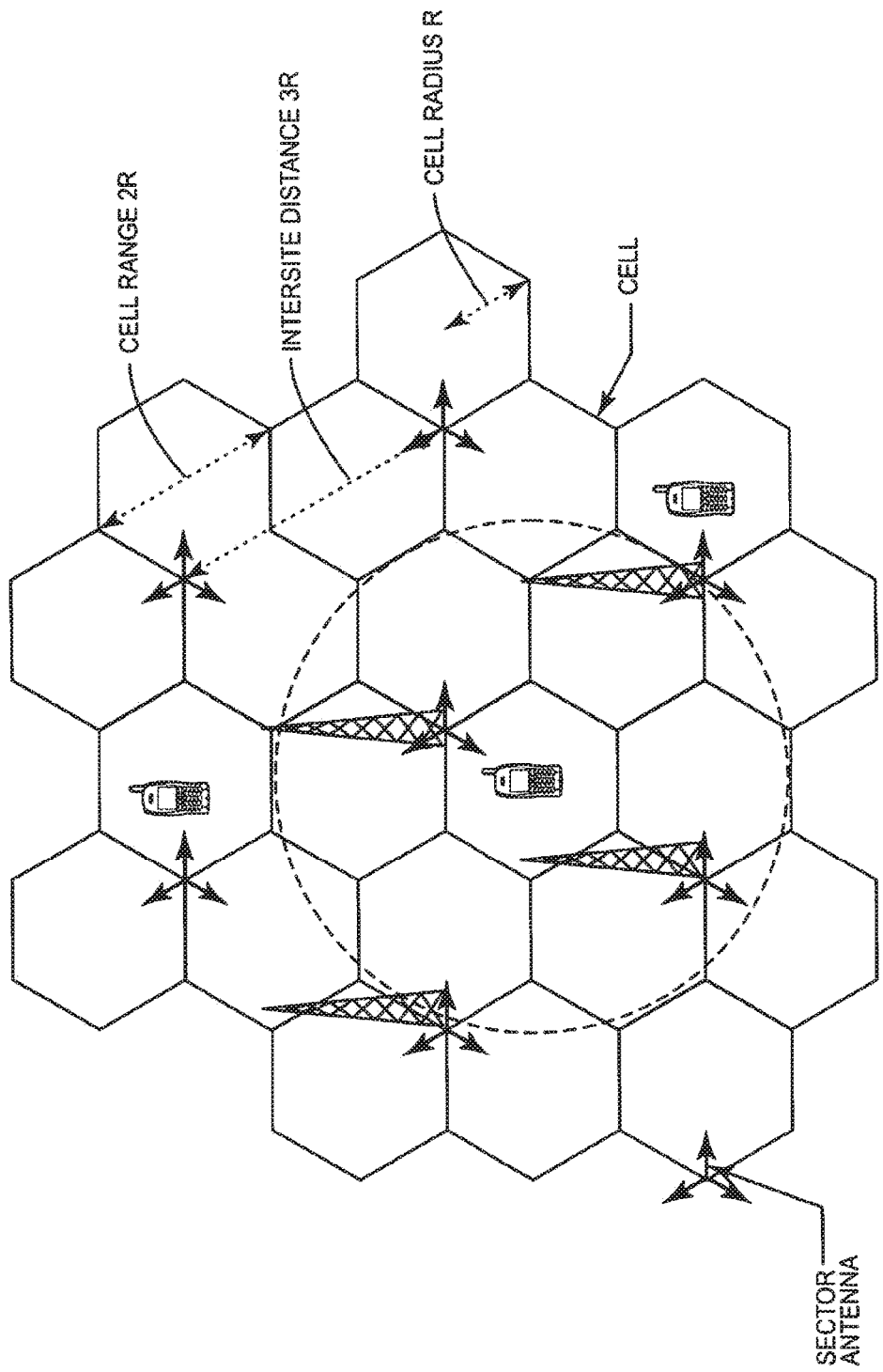
FIG. 5 illustrates a cellular network including three sector sites and seven points.
Figure 6:
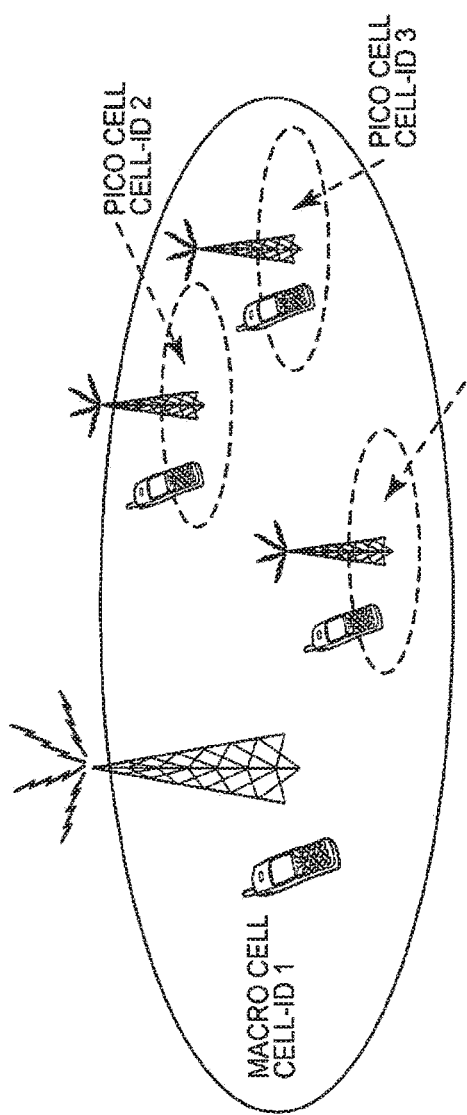
FIG. 6 illustrates an example heterogeneous network that uses separate cell-ids for each point.
Figure 7:
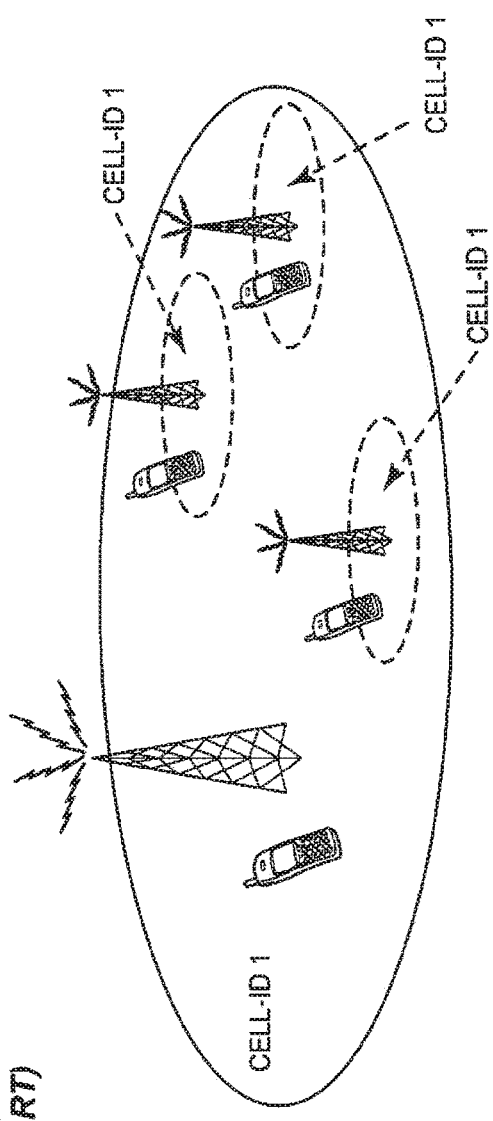
FIG. 7 illustrates an example heterogeneous network that uses the same cell-id for the macro point and multiple associated pico points.
Figure 8A:
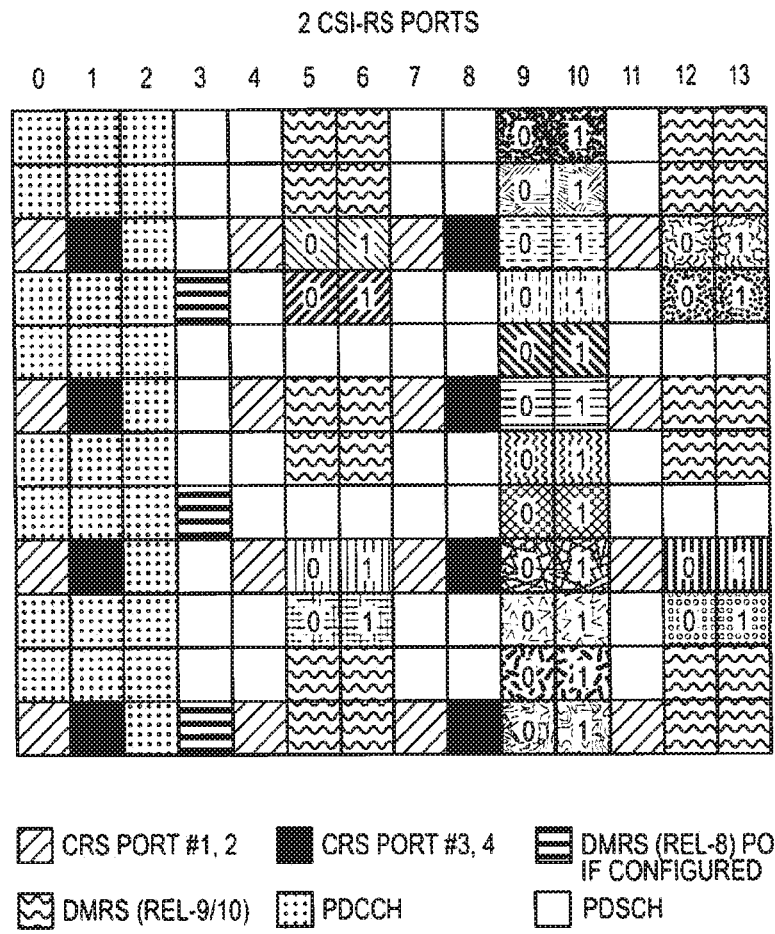
FIGS. 8*a-c* illustrates a plurality of example resource subframes and the locations of CSI-RS's within those subframes.
Figure 8B:
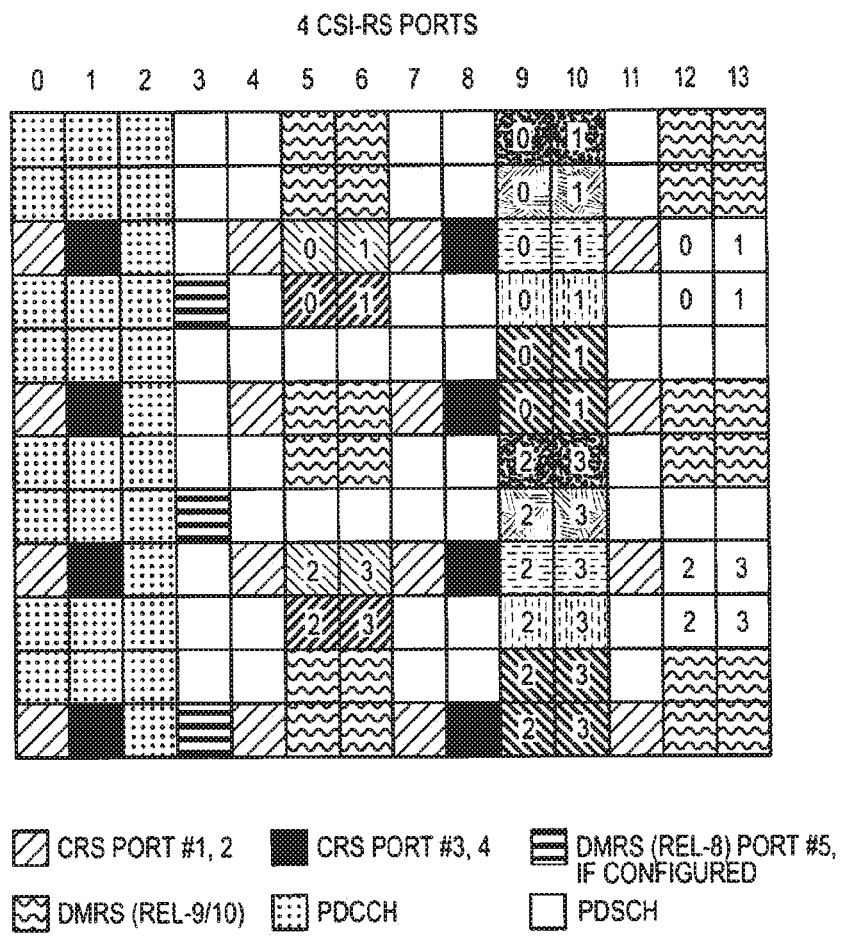
Figure 8C:
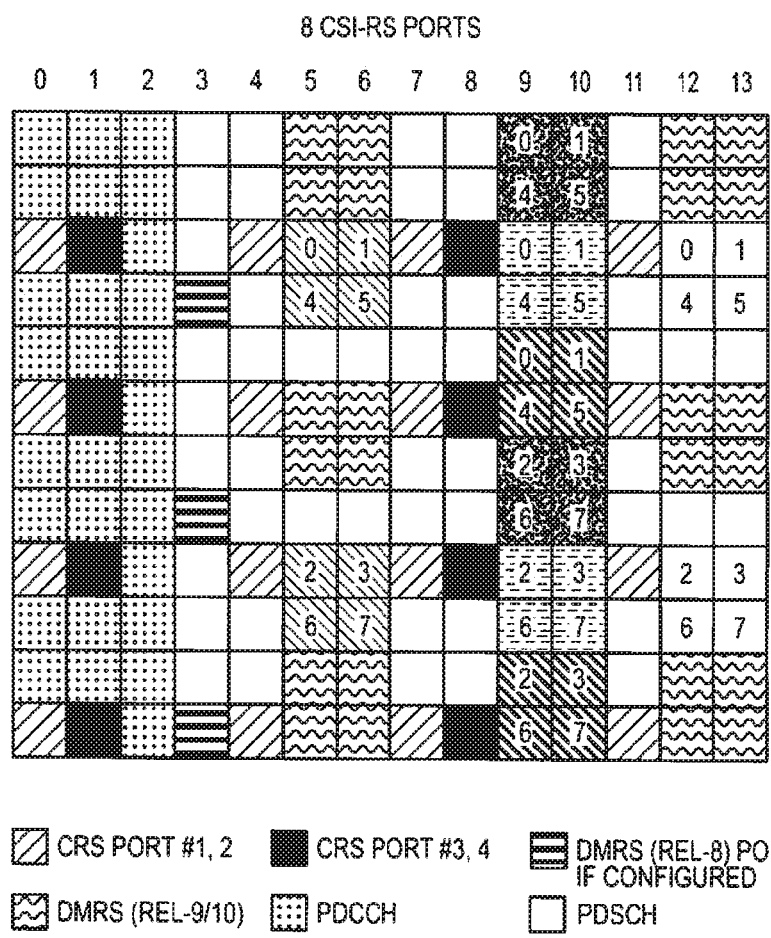
Figure 9:
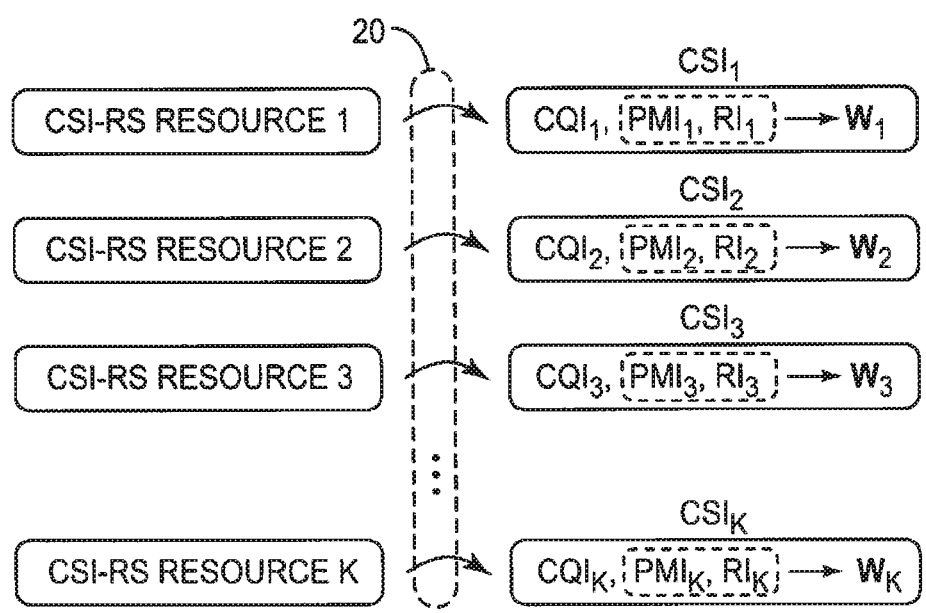
FIG. 9 illustrates a prior art MIMO precoding arrangement.
Figure 11:
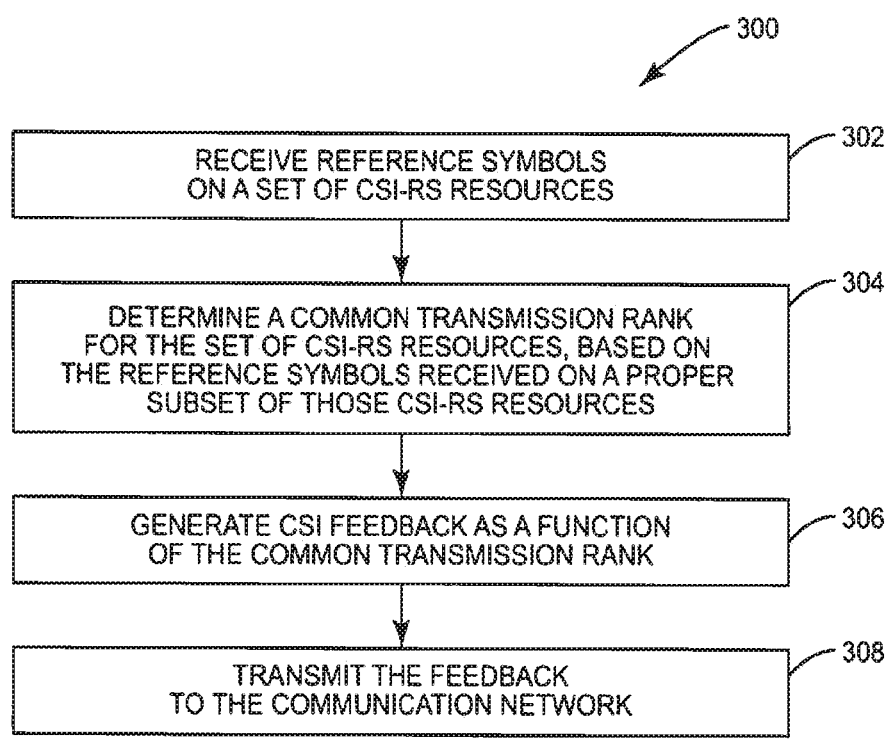
FIG. 11 illustrates a method implemented by a wireless terminal in the network of reporting channel state information.

According to one or more embodiments, the wireless terminal 100 of FIG. 10 implements the processing shown in FIG. 11 for reporting channel state information (CSI) to the wireless communication network 30. Specifically, processing at the wireless terminal 100 includes receiving reference symbols on a set 40 of K CSI reference symbol (CSI-RS) resources 42 (Block 302). A CSI-RS resource 42 is a selection of resource elements corresponding to a channel state information reference symbol (see, e.g., FIGS. 8a-c).

In at least some embodiments, the wireless terminal 100 receives the reference symbols from the one or more network nodes 200. In one embodiment, for example, the terminal 100 receives the reference symbols from a single network node 200. In other embodiments, the wireless terminal 100 receives the reference symbols from multiple network nodes 200. In one such embodiment, for example, the wireless terminal 100 receives reference symbols on a first portion of the CSI-RS resources 42 in the set 40 from a first one of the network node(s) 200, and receives reference symbols on a second portion of the CSI-RS resources 42 in the set 40 from a second one of the network node(s) 200.

Irrespective of whether the wireless terminal 100 receives the reference symbols from one or multiple network nodes 200, the CSI-RS resources 42 in some embodiments correspond to different CoMP points in a CoMP configuration. In this regard, a single network node 200 may act as multiple points in the CoMP configuration. Additionally or alternatively, different network nodes 200 may correspond to different points in the CoMP configuration. In one embodiment, for example, the wireless terminal 100 receives reference symbols on the first portion of the CSI-RS resources 42 from the first one of the network node(s) 20 (acting as a first point in a CoMP configuration) and receives reference symbols on the second portion of the CSI-RS resources 42 from the second one of the network nodes(s) 200 (acting as a second point in the CoMP configuration). In extensions of this embodiment, each CSI-RS resource 42 originates from a different CoMP point in a CoMP configuration.

Regardless, processing at the wireless terminal 100 further entails determining a common transmission rank ($r_{common}$) (Block 304). A common transmission rank as used herein is a transmission rank that commonly affects the transmission rank determined in a rank adaptation process (performed by one or more of the network nodes 200) for each CSI-RS resource 42 in the set 40 of K CSI-RS resources. In some sense, then, $r_{common}$ is considered to be a "common rank-affecting parameter." Notably, the wireless terminal 100 determines this common transmission rank based on a subset 41 of the set 40 of CSI-RS resources 42. With the terminal 100 having determined this common transmission rank in this way, processing further includes generating CSI feedback 50 as a function of that common transmission rank (Block 306), and transmitting the feedback 50 to the network node 200 (Block 308). In one or more embodiments, this arrangement may be equivalently viewed as the CSI feedback associated with one CSI-RS resource 42 inheriting the rank value (or a function thereof) from CSI feedback associated with another CSI-RS resource 42. In other words, the CSI feedback acts as a rank reference.

Of course, although the set 40 is shown as including four CSI-RS resources 42 (i.e., K=4) and the subset 41 is shown as including two CSI-RS resources 42, it is understood that these are only examples, and that other amounts of CSI-RS resources 42 could be included in the set 40 and the subset 41. In fact, in at least some embodiments, the subset 41 includes a single CSI-RS resource 42. Such embodiments prove advantageous for CoMP configurations, by assisting the network 30 in supporting dynamic switching between CoMP and non-CoMP transmission to the wireless terminal 100. Having access to non-CoMP feedback (i.e., only a single CSI-RS resource being included in the subset 41) enables the network 30 to schedule according to more robust non-CoMP operation if needed, and to dynamically switch between non-CoMP and CoMP.

Figure 12:
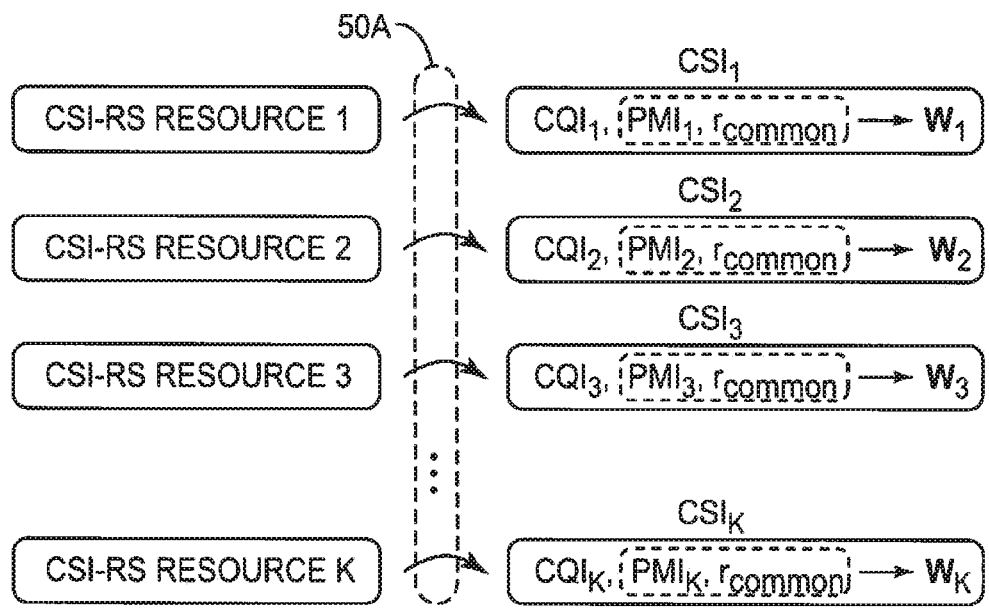
FIG. 12 illustrates an example CSI reporting configuration.
Figure 13:
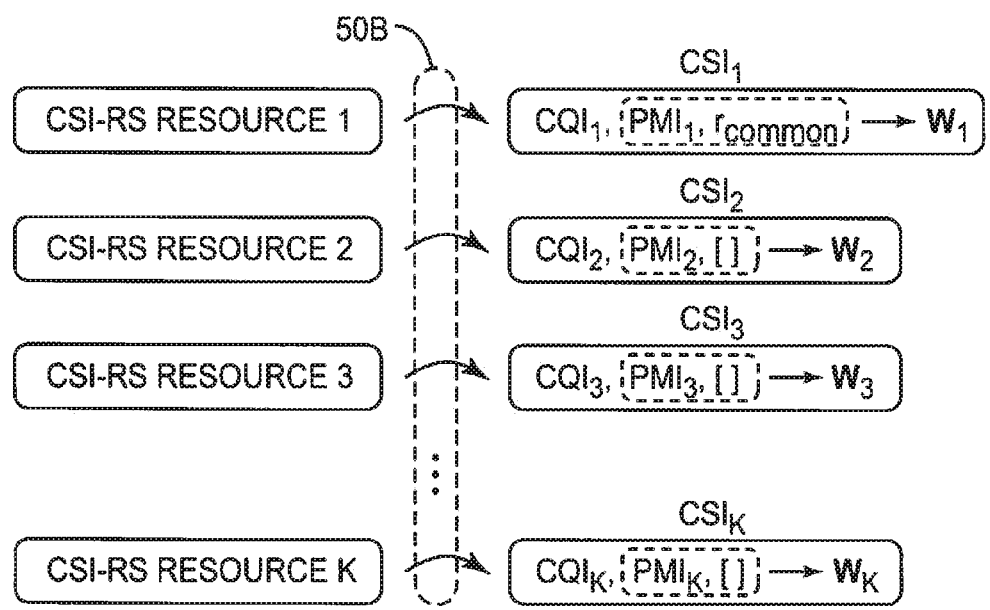
FIG. 13 illustrates another example CSI reporting configuration.
Figure 14:
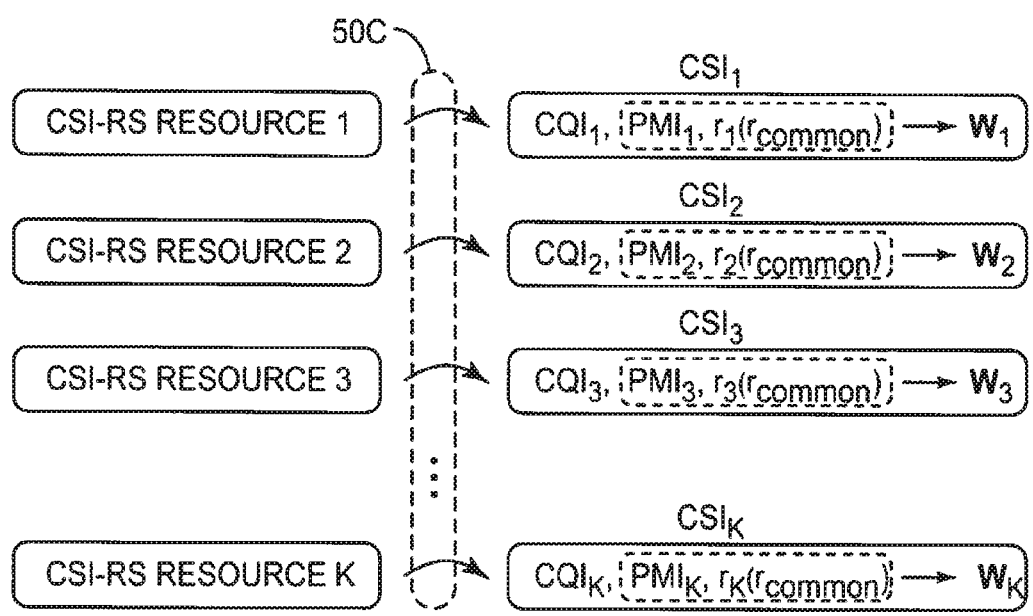
FIG. 14 illustrates yet another example CSI reporting configuration.

FIGS. 12-14 illustrate a plurality of exemplary CSI reporting configurations in which the wireless terminal 100 transmits CSI feedback 50 generated as a function of a common transmission rank ($r_{common}$). In each of these configurations, a dotted line is shown around precoder matrix indicator (PMI) and rank value(s) r to indicate that that the PMI and r value(s) are used to calculate precoders w. Each CSI label ($CSI_1$, $CSI_2$, $CSI_3$, . . . , $CSI_K$) is used to show CSI data for a given CSI-RS resource. Although the CQI values $CQI_1$, $CQI_2$, etc. are not included within dotted lines, they are still considered to be part of the CSI data for their given CSI-RS resource. Additionally, although FIGS. 12-14 describe CSI information (e.g., $CSI_1$, $CSI_2$, $CSI_3$, . . . , $CSI_K$) for the set 40 of K CSI-RS resources 42 as being collectively reported within a single CSI report 50, those skilled in the art will appreciate that different terminology could have been used to describe CSI information for the K different CSI-RS resources 42 as being separately reported within K different CSI reports.

With that in mind, FIG. 12 illustrates a novel CSI reporting configuration according to an embodiment of the method 300, in which the WT 100 reports a common transmission rank for the set 40 of CSI-RS resources in a CSI report 50A. In this embodiment, the CSI report 50A (formed by $CSI_1$, $CSI_2$, . . . , $CSI_K$ collectively) determined as a function of the common transmission rank $r_{common}$ is generated to actually include the determined common transmission rank $r_{common}$. In the embodiment of FIG. 12, the common transmission rank is transmitted once for each CSI-RS resource in the set (e.g., in a dedicated field with $r_{common}$ being the value for that field). This embodiment advantageously provides backward compatibility, as a receiving network node (e.g., node 200) receives an expected rank for each CSI-RS resource.

In the embodiment of FIG. 12, the common transmission rank is used for all CSI-RS resources in the set 40. Thus, instead of determining CSI completely separately for each CSI-RS resource, the common transmission rank, which is valid for more than one CSI-RS resource, is reported. The common transmission rank is determined based on the subset 41 of the set 40 of CSI-RS resources used for CSI reporting (e.g., a CoMP reporting set). This effectively means that the rank is determined in the WT so as to only match the characteristics of the channels corresponding to the subset 41 of CSI-RS resources, and not the full set 40 of CSI-RS resources the CSI report covers.

In another embodiment of the method 300, shown in FIG. 13, the wireless terminal 100 transmits a CSI report 50B that only includes the common transmission rank once in the entire report for a single one of the CSI-RS resources in the set (see $CSI_1$). For remaining CSI-RS resources, a null value may be used instead of the common transmission rank (see $CSI_2, CSI_3, \ldots, CSI_K$). In some embodiments, for example, the network node 200 intelligently extrapolates the common transmission rank to CSI-RS resources outside the subset 41 of CSI-RS resources based on which the common transmission rank was determined. That is, the network node 20 determine that $r_{common}$, although only received for a single CSI-RS resource, is nevertheless common for other CSI-RS resources in the set 40. The configuration of FIG. 13 advantageously provides reduced control signaling overhead in CSI feedback, since rank reporting is compressed to reporting a common transmission rank common to all the CSI-RS resources in the reporting set 40. Additionally, in one example, for the embodiments of FIGS. 12 and 13, the task of determining feedback for WTs is simplified on the network side because if a rank has already been determined based on the common transmission rank, no search over different rank hypotheses is needed.

FIG. 14 illustrates yet another novel CSI reporting configuration according to another embodiment of the method 300. In this embodiment the CSI generated as a function of the common transmission rank includes, for each CSI-RS resource, a specific value ($r_1, r_2, \ldots, r_k$) determined as a function of the common transmission rank $r_{common}$. Here, different transmission ranks are determined for different CSI-RS resources within the set 40 as a function of the common transmission rank, and the different transmission ranks are included in the CSI report 50C (formed by $CSI_1, CSI_2, \ldots, CSI_K$ collectively), but the different transmissions ranks are not independent.

In one example, the different transmission ranks ($r_1, r_2, \ldots, r_k$) are determined for each CSI-RS resource as a minimum between the common transmission rank $r_{common}$ and a maximum possible transmission rank for the CSI-RS resource. This is shown in equation (2) below.

$$r_k = \min(r_{common}, r_{max,k}) \quad \text{equation (2)}$$

In this example, $N_{T,k}$ denotes the number of antenna ports corresponding to CSI-RS resource k and $r_{common}$ is the common transmission rank determined based on the subset 41 of CSI-RS resources 42 as described above. The maximum transmission rank, $r_{max,k}$, cannot be higher than $N_{T,k}$ (and is also limited by the number of receive antennas or the number of layers the wireless terminal 100 is capable of decoding). Hence, the rank $r_k$ assumed for CSI-RS resource k in the (CoMP) reporting set would be capped according to equation (2).

In the embodiment of FIG. 14, it is the $r_k$ that would be used by the receiving network node 200 when determining precoder and CQI for CSI-RS resource k. In general, the rank $r_k$ assumed for CSI-RS resource k is a function of the common transmission rank ($r_{common}$). The dependence on the channels of the other CSI-RS resources is therefore only via that parameter and conditioned on that parameter, and the remaining parts of precoding (e.g., a precoder with a fixed number of columns) and channel quality determination is conducted independently for each CSI-RS resource k.

In one or more embodiments, the maximum transmission rank is determined by a number of antenna ports used to transmit to the wireless terminal. In such embodiments, the max rank $r_{max,k}$ in equation (2) can be replaced with $N_{T,k}$. In LTE Rel-10, for example, the number of antenna ports used may be either 1, 2, 4, or 8. By way of contrast, in the embodiments of FIGS. 12-13 the receiving network node 200 may instead implement equation (2) based on the received common transmission rank. Thus, in those embodiments, only the common transmission rank, or an equivalent representation, needs to be fed back instead of the individual $r_k$ values.

Referring again to FIG. 14, in one example, in addition to determining different transmission ranks for different CSI-RS resources within the set as a function of the common transmission rank, the WT determines a precoder and channel quality indicator (CQI) for each CSI-RS resource within the set, based on the transmission rank determined for that CSI-RS resource. Thus, $CQI_1$ and $PMI_1$ could be determined by the WT based on $r_1$ for "CSI-RS Resource 1." In this example, the CSI 50C report is generated by the WT to include the precoder and the CQI determined for each CSI-RS resource within the set.

The term "subset" is used herein in its general sense to refer to a part or portion of the set 40 of K CSI-RS resources. This contrasts with the mathematical or technical sense of the term in which a subset may be the same as the set. In mathematical terms, a "subset" as used herein is really a "proper subset." In any event, as noted above, the number of CSI-RS resources in the subset according to one or more embodiments is a single one of the CSI-RS resources.

In some embodiments, the CSI-RS resources to include in the subset are predetermined. In other embodiments, the network 30 or the wireless terminal 100 intelligently calculates or otherwise determines which CSI-RS resources to include in the subset. In either case, the CSI-RS resources that are included in the subset are determined in some embodiments by the wireless terminal based on signaling received from the wireless communication network 30 (e.g., from network node 200).

Figure 15:
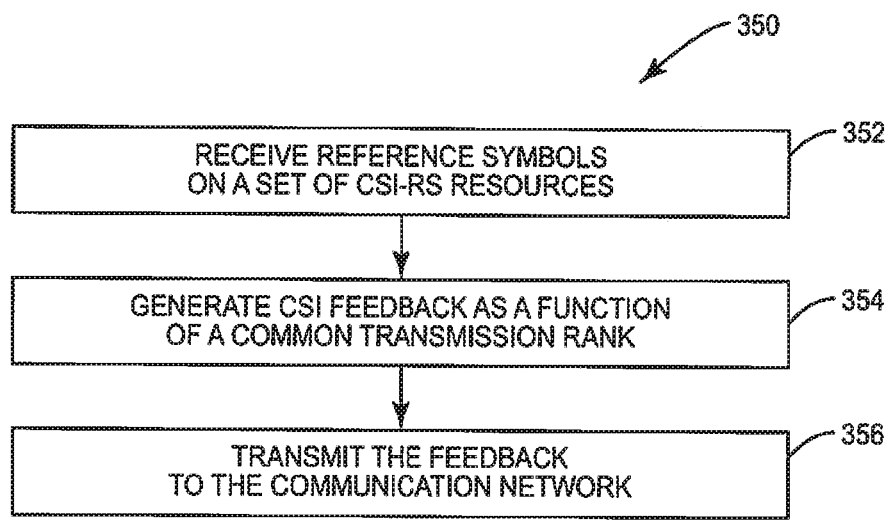
FIG. 15 illustrates another method implemented by a wireless terminal of reporting channel state information.

In one or more embodiments, the determining step (block 304) is optional in that the step may or may not be performed by the wireless terminal. Thus, in some embodiments the determining may be performed, for example, by a network node, which then notifies the wireless terminal 100 of the common transmission rank. With this in mind, FIG. 15 illustrates a method 350 according to one or more embodiments, in which wireless terminal 100 receives reference symbols on a set 40 of K CSI reference symbol (CSI-RS) resources 42 (Block 352), generates CSI feedback as a function of a common transmission rank for the set for CSI-RS resources (Block 354), and transmits the CSI feedback to the communication network (Block 356).

Figure 16:
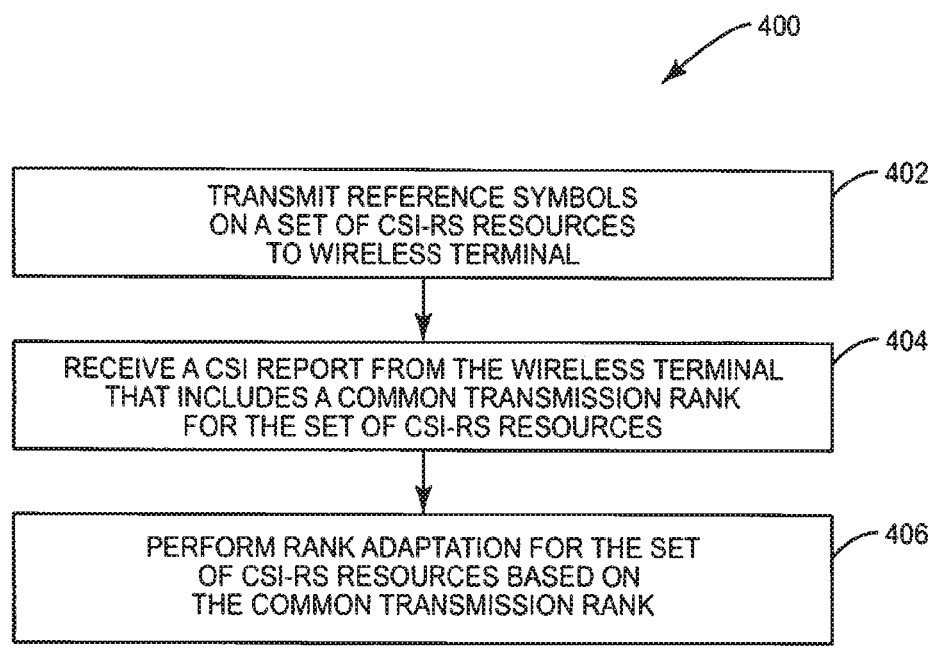
FIG. 16 illustrates a method implemented by a network node for adapting the transmission rank of a transmission between a wireless device and a wireless communication network.

Referring now to FIG. 16, a method 400 implemented by a network node (e.g., network node 200) for adapting the transmission rank of a transmission between a wireless device and a wireless communication network is shown. The network node transmits reference symbols on a set of CSI-RS resources to the wireless terminal 100 (Block 402). The network node later receives a CSI report from the wireless terminal that includes a common transmission rank ($r_{common}$) determined based on the reference symbols transmitted on a subset 41 of the CSI-RS resources 42 in the set 40 (Block 404), wherein the common transmission rank in the CSI report is common for the set of CSI-RS resources. That is, the network node extrapolates or otherwise applies the common transmission rank to CSI-RS resources 42 outside of the subset 41, even though that common transmission rank was determined based only on the CSI-RS resources 42 in the subset 41. In accordance with this determination, the network node performs rank adaptation for the set of CSI-RS resources based on the common transmission rank (Block 406).

In one or more embodiments, the received CSI report includes the common transmission rank $r_{common}$ (see, e.g., FIGS. 12, 13). In one or more of these embodiments, the network node determines different transmission ranks for different CSI-RS resources within the set as a function of the reported common transmission rank $r_{common}$. In this case, rather than the wireless terminal 100 determining individual ranks ($r_1, r_2, r_3, \ldots, r_k$) as a function of $r_{common}$ and then reporting those individual ranks, as shown in FIG. 14, the network node itself determines those individual ranks based on the common transmission rank $r_{common}$ reported by the terminal 100. In one example, the individual rank for each CSI-RS resource is determined as a minimum between the common transmission rank and a maximum possible transmission rank for the CSI-RS resource, as discussed above in relation to equation (2). Thus, equation (2) can be calculated by the wireless terminal side or the network node, depending on what is included in the CSI report 50. In one or more other embodiments, the network node determines the transmission rank for each CSI-RS resource in the set to be the common transmission rank, based on the only transmission rank included in the CSI feedback for the set being the common transmission rank.

In one example, the network node transmits an indication of the CSI-RS resources in the set to be included in the subset to the wireless terminal. As in the method of FIG. 10, the quantity of CSI-RS resources in the subset may be a single one of the CSI-RS resources. The network node may dynamically switch between a Coordinated Multi-Point (CoMP) transmission scheme and a non-CoMP transmission scheme based on CSI being reported for only a single CSI-RS resource within the subset (i.e., if the subset includes a single CSI-RS resource). This method of transitioning from CoMP to non-CoMP advantageously incurs only a low signaling overhead.

Such signaling indicating what CSI-RS resources to include in the subset 41 may be performed semi-statically via higher layer signaling (e.g. RRC or MAC element) or more dynamic via physical layer control channels (e.g. PDCCH or other forms of downlink control). The subset could also be determined implicitly via a predetermined rule referring to the configuration of what CSI-RS resources to measure on (CoMP measurement set) or report for (CoMP reporting set). Such a rule could for example say that the first L CSI-RS resources in the (CoMP) measurement/report set configuration message would form the rank determining CSI-RS resource subset. The rank determining subset of CSI-RS resources could alternatively be determined by the WT instead of by the network. The subset could be selected to comprise the CSI-RS resources with the corresponding strongest long-term/short-term channels.

Figure 17:
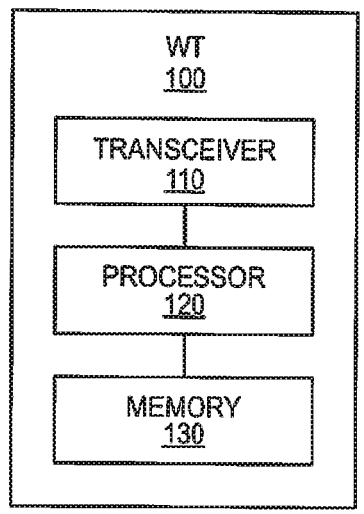
FIG. 17 illustrates an example user terminal operative to implement the methods of FIGS. 11 and 15.
Figure 18:
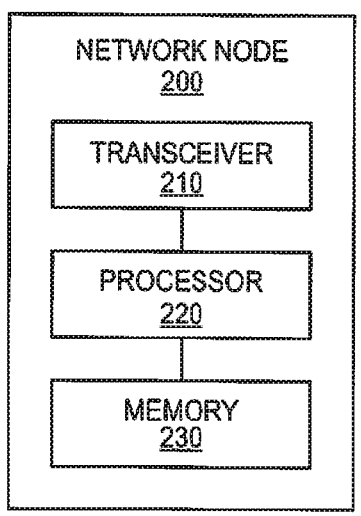
FIG. 18 illustrates an example network node operative to implement the method of FIG. 16.

FIGS. 17 and 18 illustrate an example wireless terminal 100 and corresponding network node operative to implement a novel method of reporting channel conditions. Referring to FIG. 17 the wireless terminal 100 is shown, that includes a transceiver 110, memory 130, and a processor 120 including one or more processing circuits. The one or more processing circuits may include, for example, one or more microprocessors, microcontrollers, digital signal processors, Application Specific Integrated Circuits (ASICs) or the like. In one example the wireless device 100 is operable to implement the method 300 or 350 in one or more of its various embodiments as described above. Thus, in one or more embodiments the one or more processing circuits are configured to receive reference symbols on a set of channel state information reference symbol (CSI-RS) resources via the transceiver 110, and to (optionally) determine a common transmission rank (also termed, e.g., a common rank-affecting parameter) for the set of CSI-RS resources, based on the reference symbols received on a subset of those CSI-RS resources. The one or more processing circuits are further configured to generate CSI feedback as a function of the common transmission rank. In some embodiments, generating the CSI feedback in this regard entails generating the CSI report to include the common transmission rank. In other embodiments, by contrast, generating the CSI feedback involves generating the feedback to include different transmission ranks for the different CSI-RS resources in the set as a function of the common transmission rank, i.e., the common transmission rank is not itself included in the CSI feedback (at least in the same sense). In any event, the one or more processing circuits are also configured to transmit the CSI feedback to the communication network via the transceiver 110. In at least some embodiments, the one or more processing circuits are configured by executing instructions stored in the memory 130.

Referring to FIG. 18, a network node 200 is shown, that includes a transceiver 210 configured to send messages to and receive messages from a wireless device 100 in a wireless communication network, and a processor 220 operatively coupled to the transceiver 210. The processor 220 includes one or more processing circuits that may include, for example, one or more microprocessors, microcontrollers, digital signal processors, Application Specific Integrated Circuits (ASICs) or the like. In one example, the network node 200 is operable to implement the method 400 in one or more of its various embodiments as described above. Thus, in one or more embodiments the one or more processing circuits 220 are configured to: transmit reference symbols on a set of CSI-RS resources via the transceiver 210; and to receive, via the transceiver 210, CSI feedback that includes a common transmission rank determined based on the reference symbols transmitted on a subset of the CSI-RS resources in the set, wherein the common transmission rank in the CSI report is common for the set of CSI-RS resources. In some embodiments, the processor 220 is operative to configure channel state reporting by the wireless device 100 by sending the wireless device 100 configuration information including an indication of two or more channel state information resources forming a reporting set for the wireless device, and an indication of a subset of the channel state information resources in the reporting set to be used by the wireless device for determining the common rank-affecting parameter for the CSI-RS in the reporting set. In any event, the one or more processing circuits are further configured to perform rank adaptation for the set of CSI-RS resources based on the common transmission rank. In at least some embodiments, the network node 200 further comprises memory 230 coupled to the processor 220.

Note that although terminology from 3GPP LTE has been used in this disclosure to exemplify the invention, this should not be seen as limiting the scope of the invention to only the aforementioned system. Other wireless systems, including WCDMA, WiMax, UMB and GSM, may also benefit from exploiting the ideas covered within this disclosure. The presented idea of letting a subset of RS resources determine the rank used for each RS resource in, as well as outside, that subset generally applies to any kind of reference signal.

Additionally, although the CSI-RS resources have been described as including a set and a subset, it is possible that the "set" of CSI-RS resources may not include all CSI-RS resources for a given WT. For example, assume that there are four CSI-RS resources for a WT, and that the WT reports two ranks. In one example the first rank may be determined by CSI-RS resource 1, and is common for CSI-RS resources 1, 2, and 3, and the second rank may be determined by resource 4 and be common only to CSI-RS resource 4. Thus, the "set" of CSI-RS resources as that term is used above includes resources 1, 2 and 3 because those are the resources for which the subset is common—however the "set" in this regard is part of a larger set that includes resource 4.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

The invention claimed is:

1. A method implemented by a wireless terminal for reporting channel state information (CSI) to a wireless communication network, comprising:
   receiving reference symbols on a set of channel state information reference symbol (CSI-RS) resources;
   receiving from the wireless communication network a configuration message that configures the wireless terminal to use a certain CSI-RS resource in the set for determining a common transmission rank for the set of CSI-RS resources;
   determining the common transmission rank for the set of CSI-RS resources as being the same as a transmission rank for the certain CSI-RS resource that the configuration message configures the wireless terminal to use;
   generating CSI feedback to report the common transmission rank as an individual transmission rank for each CSI-RS resource in the set; and
   transmitting the CSI feedback to the wireless communication network.

2. The method of claim 1, further comprising receiving reference symbols on another CSI-RS resource not belonging to the set, and wherein said generating comprises generating the CSI feedback to report a transmission rank for said another CSI-RS resource that is different than said common transmission rank.

3. The method of claim 1, further comprising receiving reference symbols on other CSI-RS resources not belonging to the set, and determining a common transmission rank for said other CSI-RS resources that is different than the common transmission rank for said set, and wherein said generating comprises generating the CSI feedback to also report the common transmission rank for said other CSI-RS resources as the individual transmission rank for each of said other CSI-RS resources.

4. The method of claim 3, wherein the other CSI-RS resources belong to a different set of CSI-RS resources, and wherein said determining comprises determining the common transmission rank for the different set of CSI-RS resources to be the same as a transmission rank for a certain other CSI-RS resource that the configuration message configures the wireless terminal to use.

5. The method of claim 1, further comprising determining the transmission rank for the certain CSI-RS resource, wherein the CSI feedback reports the common transmission rank such that the certain CSI-RS resource serves as a reference CSI-RS resource.

6. A wireless terminal operative to report channel state information (CSI) to a wireless communication network, the wireless terminal comprising a transceiver, and one or more processing circuits configured to:
   receive reference symbols on a set of CSI reference symbol (CSI-RS) resources via the transceiver;
   receive from the wireless communication network a configuration message that configures the wireless terminal to use a certain CSI-RS resource in the set for determining a common transmission rank for the set of CSI-RS resources;
   determine the common transmission rank for the set of CSI-RS resources as being the same as a transmission rank for the certain CSI-RS resource that the configuration message configures the wireless terminal to use;
   generate CSI feedback to report the common transmission rank as an individual transmission rank for each CSI-RS resource in the set; and
   transmit the CSI feedback to the wireless communication network via the transceiver.

7. The wireless terminal of claim 6, wherein the one or more processing circuits are configured to receive reference symbols on another CSI-RS resource not belonging to the set, and to generate the CSI feedback to include a transmission rank for said another CSI-RS resource that is different than said common transmission rank.

8. The wireless terminal of claim 6, wherein the one or more processing circuits are configured to receive reference symbols on other CSI-RS resources not belonging to the set, determine a common transmission rank for said other CSI-RS resources that is different than the common transmission rank for said set, and generate the CSI feedback to also report the common transmission rank as the individual transmission rank for each of said other CSI-RS resources.

9. The wireless terminal of claim 8, wherein the other CSI-RS resources belong to a different set of CSI-RS resources, and wherein the one or more processing circuits are configured to determine the common transmission rank for the different set of CSI-RS resources to be the same as a transmission rank for a certain other CSI-RS resource that the configuration message configures the wireless terminal to use.

10. The wireless terminal of claim 6, wherein the one or more processing circuits are configured to determine the transmission rank for the certain CSI-RS resource, wherein the CSI feedback reports the common transmission rank such that the certain CSI-RS resource serves as a reference CSI-RS resource.

11. A method implemented by a network node for adapting a transmission rank of a transmission between a wireless terminal and a wireless communication network, comprising:
   transmitting reference symbols on a set of channel state information reference symbol (CSI-RS) resources;
   transmitting from the network node to the wireless terminal a configuration message that configures the wireless terminal to use a certain CSI-RS resource in the set for determining a common transmission rank for the set of CSI-RS resources;
   receiving from the wireless terminal CSI feedback that reports a common transmission rank for the set of CSI-RS resources as being the same as a transmission rank for the certain CSI-RS resource that the configuration message configures the wireless terminal to use; and performing rank adaptation for the set of CSI-RS resources based on the common transmission rank.

12. The method of claim 11, further comprising transmitting reference symbols on another CSI-resource not belonging to the set, and wherein the CSI feedback reports a transmission rank for said another CSI-RS resource that is different than said common transmission rank.

13. The method of claim 11, further comprising transmitting reference symbols on other CSI-RS resources not belonging to the set, and wherein the CSI feedback reports a common transmission rank for said other CSI-RS resources that is different than the common transmission rank for said set, and wherein the CSI feedback also reports the common transmission rank for said other CSI-RS resources as the individual transmission rank for each of said other CSI-RS resources.

14. The method of claim 13, wherein the other CSI-RS resources belong to a different set of CSI-RS resources, and wherein the CSI feedback reports the common transmission rank for the different set of CSI-RS resources to be the same as a transmission rank for a certain other CSI-RS resource that the configuration message configures the wireless terminal to use.

15. The method of claim 11, wherein the CSI feedback reports the common transmission rank such that the certain CSI-RS resource serves as a reference CSI-RS resource.

16. The method of claim 15, further comprising dynamically switching between a Coordinated Multi-Point (CoMP) transmission scheme and a non-CoMP transmission scheme based on the CSI feedback.

* * * * *

UNITED STATES PATENT AND TRADEMARK OFFICE
CERTIFICATE OF CORRECTION

PATENT NO. : 10,079,631 B2
APPLICATION NO. : 15/040079
DATED : September 18, 2018
INVENTOR(S) : Jöngren Page 1 of 1

It is certified that error appears in the above-identified patent and that said Letters Patent is hereby corrected as shown below:

In the Specification

In Column 1, Line 8, delete "2012," and insert -- 2012, now Pat. No. 9,264,120, --, therefor.

In Column 10, Line 6, delete "Multiple-Input/" and insert -- Multiple-Input --, therefor.

In Column 10, Line 47, delete "CSI-RS's" and insert -- CSI-RSs --, therefor.

In Column 11, Line 56, delete "node(s) 20" and insert -- node(s) 200 --, therefor.

Signed and Sealed this
Second Day of July, 2019

Andrei Iancu
*Director of the United States Patent and Trademark Office*